United States Patent [19]
Drefenstedt

[11] Patent Number: 5,504,743
[45] Date of Patent: Apr. 2, 1996

[54] MESSAGE ROUTING

[75] Inventor: Reinhard Drefenstedt, Brunnenstr., Germany

[73] Assignee: British Telecommunications public limited company, London, England

[21] Appl. No.: 210,469

[22] Filed: Mar. 21, 1994

[30] Foreign Application Priority Data

Dec. 23, 1993 [EP] European Pat. Off. ............. 93310502

[51] Int. Cl.6 .................................................. H04L 12/56
[52] U.S. Cl. ........................................ 370/60.1; 370/94.2
[58] Field of Search ..................... 370/94.1, 94.2, 370/60, 60.1, 58.1, 58.2, 58.3, 84, 112

[56] References Cited

U.S. PATENT DOCUMENTS

| | | | |
|---|---|---|---|
| 4,964,119 | 10/1990 | Endo et al. ............................ | 370/60 |
| 5,001,702 | 3/1991 | Teraslinna et al. ..................... | 370/60 |
| 5,032,987 | 7/1991 | Broder et al. .......................... | 364/200 |
| 5,084,867 | 1/1992 | Tachibana et al. ...................... | 370/60 |
| 5,099,475 | 3/1992 | Kozaki et al. .......................... | 370/60 |
| 5,124,977 | 6/1992 | Kozaki et al. .......................... | 370/60 |
| 5,237,564 | 8/1993 | Lespagnol et al. ...................... | 370/60 |
| 5,249,178 | 9/1993 | Kurano et al. .......................... | 370/60 |
| 5,303,233 | 4/1994 | Sugawara ............................... | 370/60 |

FOREIGN PATENT DOCUMENTS

| | | |
|---|---|---|
| 0365337 | 4/1990 | European Pat. Off. . |
| 0373299 | 6/1990 | European Pat. Off. . |
| 0473066 | 3/1992 | European Pat. Off. . |
| 0482550 | 4/1992 | European Pat. Off. . |

Primary Examiner—Benedict V. Safourek
Assistant Examiner—Ajit Patel
Attorney, Agent, or Firm—Nixon & Vanderhye

[57] ABSTRACT

A communications routing device for receiving messages from a plurality of input channels and routing the messages to one of a plurality of output channels, wherein the routing structure includes a plurality of parallel memory devices storing lookup tables and interconnection circuits for selectively linking messages from one input channel to one of the plurality of memory devices depending on the content of the received message.

36 Claims, 7 Drawing Sheets

MESSAGE ROUTING

FIELD OF THE INVENTION

This invention relates to methods and apparatus for message routing. Particularly, but not exclusively, this invention relates to packet communication; it is particularly useful in packet networks, such as Asynchronous Transfer Mode (ATM) where the packet header may be changed en route.

BACKGROUND OF THE INVENTION

The ATM packet transmission protocol is described in "Asynchronous Transfer Mode-Solution for broadband ISDN", by Martin de Prycker, published by Ellis Horwood, incorporated herein by reference. Generally, a packet (termed a "cell" in ATM parlance) is addressed to a destination which is specified in the packet header by address data comprising a 12 bit Virtual Path Indicator (VPI) and a 16 bit Virtual Channel Indicator (VCI). In general terms, the VCI indicates the entire "Virtual Channel" connection route from the source to the destination through the network, via switching nodes or exchanges, whereas the VPI indicates a path through the network between nodes or switching centres of the network, which may be taken by packets forming part of several different virtual circuits. At each node, the packet arrives on an inward channel (e.g. fibre optic cable), its header is examined, and it is routed out on an outward channel in dependence upon its address data.

It is possible for each node to act in a completely predetermined manner in routing a packet on an outward channel which depends only on the address data in the packet. However, it is also possible for each node to vary the address data of a packet in passage, so as to redirect the packet on an alternative route to its destination. This is advantageous in traffic management, for example to avoid an overloaded or damaged node.

At each node, a lookup table (held, for example, in Random Access Memory (RAM)) is generally provided, the address data (i.e. VCI and VPI) in a packet being used to access the lookup table to derive the identity of the output line from the node on which the packet is to be directed towards its destination. If the node is also to vary the address data, the lookup table needs additionally to contain the new VCI and VPI address data.

In the ATM system, each packet includes address data comprising a 16 bit VCI and a 12 bit VPI. Although it would be possible to operate by merely changing the VPI, for full flexibility a node would be capable of changing both the VCI and the VPI. If the node has N input or output lines, and if the table is arranged as a 'flat' lookup table with a direct one-to-one correspondence between input addresses and output addresses, the size of the table to be held at the node is $N.2^{16}.2^{12}$, and each entry in the table needs to be ($16+12+\log_2 N$) bits long. Thus, for a node to which 256 lines are connected (N=256 requiring 8 bits to encode N), each entry in the table is (28+8=36 ×4.5 bytes) long, and the table must contain $2^{36}$ bits=64 Gigabits so that the total size of the table needs to be 288 Gigabytes. This is a very substantial volume of memory.

One possibility is to arrange such a table as a single contiguous memory address space, with an input (address) bus to which all N input channels are connected, and an output (data) bus connected to all the outlet channels. In this case, to avoid bus contention, it would be necessary to allocate time on the input bus between the N available channels. Thus, the access time which each channel must, on average, wait to access the lookup table increases proportionately to the number of channels N, since the time available to each channel decreases in proportion to N.

As messages may be arriving through optical fibre channels at a rate of hundreds of Megabits per second, in the form of a large number of relatively short packets, it will be seen that this method very rapidly becomes unusable if it is desired to provide a large number of input and outlet channels to a node, no matter how fast individual accesses to the memory can be made.

Rather than use a single, "flat" lookup table, it may be possible to use a multiple step access, "folded" memory technique. However, multiple memory read operations take time and the arrangement of data may be less convenient for alteration or rewriting.

An alternative would be to provide each input channel with a separate lookup table. In this case, there is no bus contention for access to the lookup table, so that the access time is fast regardless of the number of the input channels. Where there are N input channels, each input channel requires a table of 1/N times the same size as that above, so that the total amount of memory required over all nodes is the same as that above. In an ATM system, with 28 bits of VPI and VCI address data, each memory thus needs to be of size $2^{28}*(28+\log N)$ bits, which is [0.9 GBytes+33 MBytes * logN]. This is around the size of mainframe memories, and could require, for each input channel, of the order of 477 16Mbit memory chips.

In fact, input channels will not actually receive packets carrying the whole range of VCI and VPI addresses; the total range in each case will be smaller and it would consequently be possible to use a smaller address range (and hence a smaller table requiring a smaller volume of memory) for each input channel memory device. However, to allow for the possibility that any channel may become busy it would be necessary to provide, in each memory, an additional "overhead" volume of memory space (over and above the volume likely to be requested which is not normally used but which could occasionally be required. This overhead memory is thus needed in each input channel memory device, and hence the total memory required rises quite sharply with the number of input channels.

SUMMARY OF THE INVENTION

The present invention provides a node (e.g. exchange station) for a message transmission system (e.g. a packet system, for example an ATM system) in which the lookup table is provided as several discrete memories, and there are provided interconnection means for selectively linking one of a plurality (for example all) of the memories to each of the input channels. In this manner, the average access time is relatively fast (approaching that of separately provided route tables) and yet the memory size may be kept constrained because the amount of overhead memory is reduced; instead of having to provide an overhead of extra memory for every input channel, sufficient memory overhead is provided for several input channels, and is utilised by whichever channels are busy from time to time.

Another advantage of the present invention is that it may be easier to update the contents of the memory since the memory devices may be co-located rather than dispersed at the input channel receiver circuits.

Viewed in another way, the present invention provides a node for a transmission system in which the routing table comprises an emulation of a single flat multiport memory table shared between the input channels.

Preferably, the separate memories do not contain data relating to contiguous header addresses, but instead the data is distributed between the memory devices in a predetermined (e.g. pseudorandom) fashion, and addresses corresponding to each packet header are decoded and distributed to the relevant memory device. This reduces congestion for particular memory devices where a number of packets are destined for the same or similar destinations, and thus reduces the access time to the memory devices.

Other preferred features and embodiments are as described or claimed hereafter.

BRIEF DESCRIPTION OF THE DRAWINGS

The invention will now be illustrated, by way of example only, with reference to the accompanying drawings in which:

FIG. 2b shows in greater detail parts of the node of FIG. 2a;

DETAILED DESCRIPTION OF THE DRAWINGS

Figure 1:
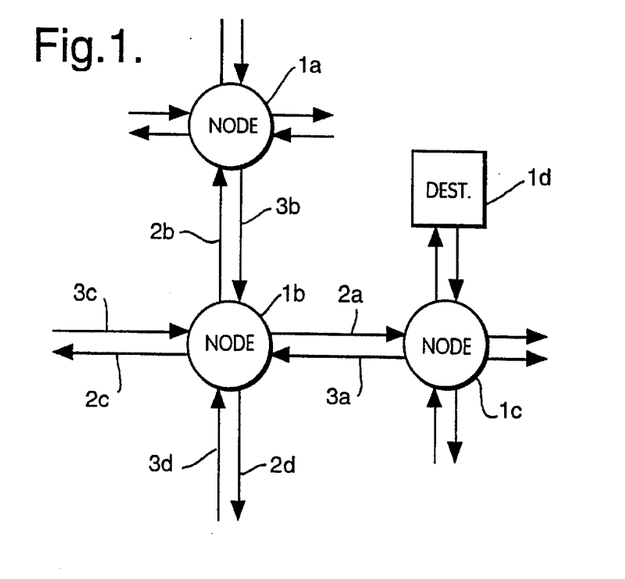
FIG. 1 shows schematically a message transmission system including a node with which the present invention is useable.

Referring to FIG. 1, a message transmission system comprises at least one node 1a, 1b, 1c connected to a plurality of outlet channels 2a–2d and a plurality of inlet channels 3a–3d. Typically, as shown, the inlet and outlet channels are paired. At least one node 1c is connected to a destination 1d. A message to be transmitted is received at a node 1b on an inlet channel (for example 3b), and routed through the node 1b to one of a plurality of possible output channels (for example 2d). Each node therefore acts as a switch device or routing station, and may typically be a local exchange. Each channel may comprise a physically separate communications link (for example an optical fibre cable, radio path or twisted pair cable), or may be one of a plurality of logical channels carried by such a physical channel (for example, it may be a time slot in a TDMA frame).

Figure 2A:
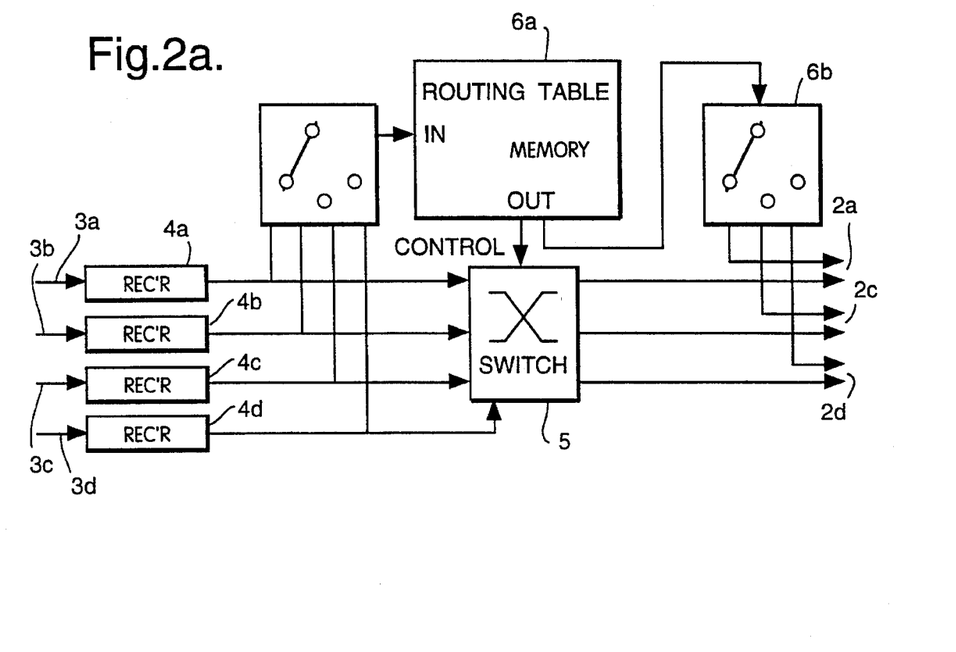
FIG. 2a shows schematically the structure of a known node.

Referring to FIG. 2a, a node 1 comprises a receiver unit 4 for each channel, which separates information from a physical channel into discrete messages; a routing network 5 connected to each receiver unit 4 and arranged to direct a message from the receiver unit to a selected one of the outlet channels 2a–2d; and a control unit 6, connected to each receiver unit 4 and responsive to the address data in a received message to control the routing network 5. The control circuit 6 generates a code which specifies, for the routing network 5, the output channel to which the message is to be directed.

Figure 2B:
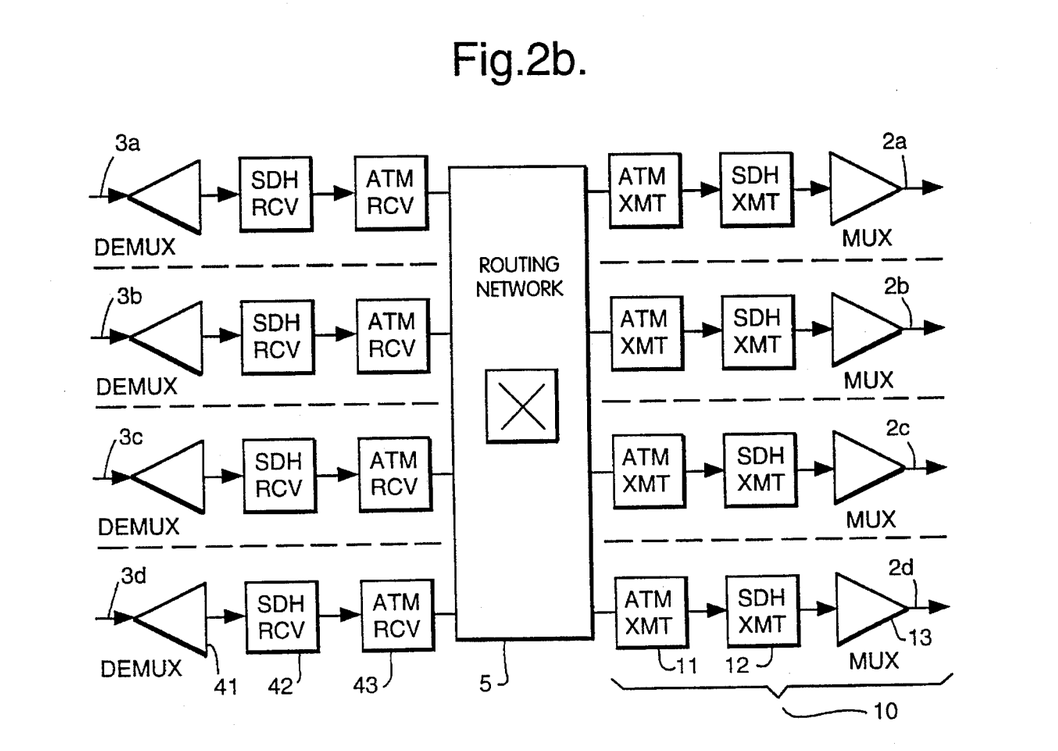

Referring to FIG. 2b, each of the receiver units 4 comprises a demultiplexer 41, a frame receiver 42, and a packet receiver 43. For clarity, only the devices for the receiver 4d are labelled. An incoming bit stream on the channel 3d is demultiplexed by a demultiplexer 41 and assembled into frames by the frame receiver 42, each frame being split into ATM packets or cells by the ATM receiver 43.

Likewise, transmitter units 10 are provided for each output channel 2, each transmitter unit 10 comprising an ATM cell combiner 11, a frame assembler 12 which assembles a plurality of ATM messages or cells into a frame; and a multiplexer 13 which multiplexes frames on to the output channel 2.

In practice, input channels 3 and output channels 2 are provided as pairs and tile channel receivers 4 are typically co-located with the channel transmitters 10, for example on a single printed circuit board carrying the above described hardware.

Referring to FIG. 3, a packet message in the ATM transmission system comprises a data portion 8 and a header portion 7. The data portion 8 comprises 48 bytes (e.g. 384 bits). The header portion comprises 5 bytes (40 bits), including a 16 bit virtual channel indicator (VCI) 7a and a 12 bit virtual path indicator (VPI) 7b.

Thus far, the description corresponds generally to a known message transmission system, as well as to one embodying the invention. The present invention differs in the structure of the control circuit 6. In a known packet switching transmission system, the control circuit 6 comprises a memory unit 6a storing a plurality of table entries each indicating an outlet channel for setting the routing network 5, and, in preferred embodiments, new VCI and VPI addressing data to be written into the header 7 of the packet by a combiner unit 6b. The look-up table is addressed by an address comprising the VCI, the VPI and a code indicating the identity of the inlet channel on which the message arrived (this being needed since, in principle, the same VPI & VCI address could occur on several different input channels needing different routing).

Figure 3A:
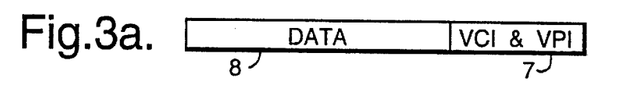
FIG. 3a shows schematically the structure of an ATM packet comprising a message to which the present invention is applicable.
Figure 3B:
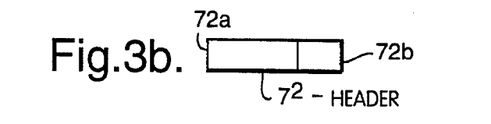
FIGS. 3b–3g show corresponding structures at points in operation of the following embodiments.
Figure 3C:
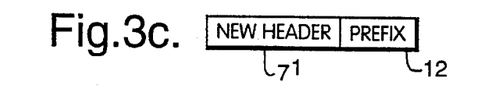
Figure 4:
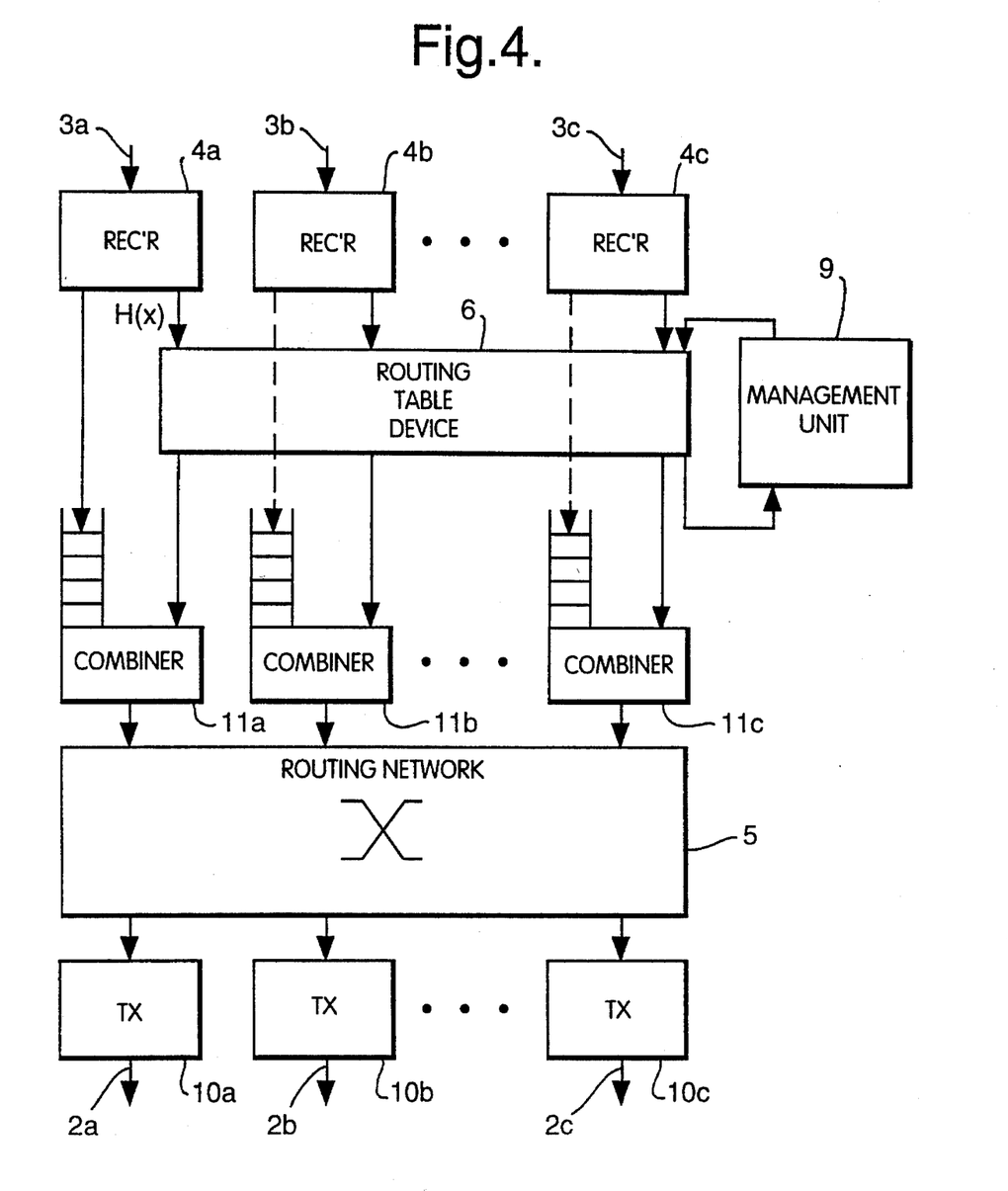
FIG. 4 shows schematically a node according to a first embodiment of the present invention.
Figure 5:
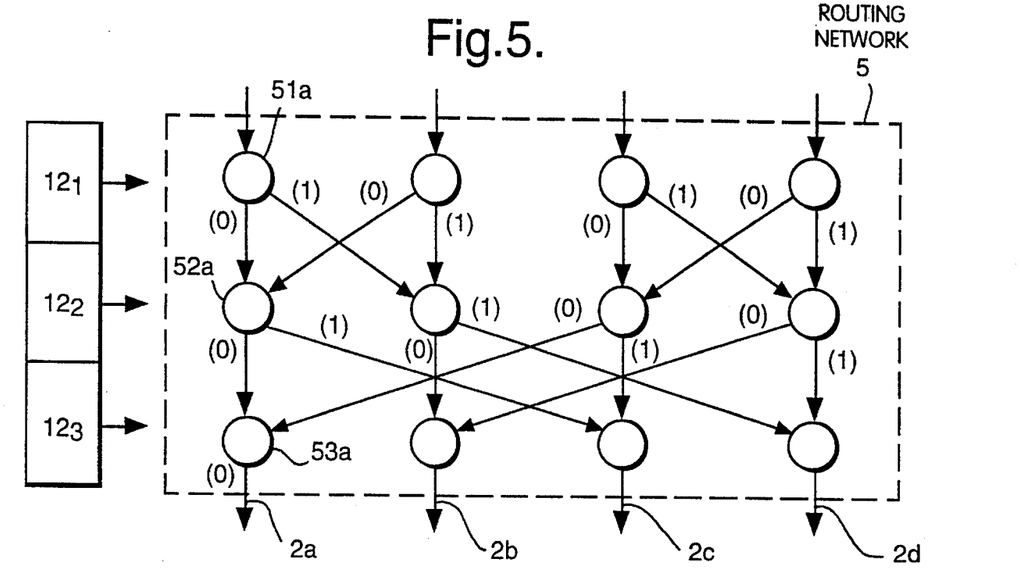
FIG. 5 shows schematically a routing network forming part of the node of FIG. 4.

Referring now to FIG. 4, in a first embodiment, a routing station acting as a node (exchange) in an ATM message transmission system comprises a plurality (N) of input channel receivers 4a–4c (e.g. optical receivers) connected to respective input channels 3a–3c, a routing table device 6, a management unit 9 (e.g. a computer), a plurality of combiners 11a–11c; a routing network 5; and a plurality (N) of output channel transmitters 10a–10c connected to respective output channels 2a–2c. In practice there may be, for example, N=4096 input and output channels. The management unit 9 is arranged to amend the routing table held in the device 6, to take account of traffic management demands on the telecommunications network. The input channel receivers are arranged on receipt of a message packet ("cell"), to examine the header and to supply an address signal to the device 6. The routing table device 6 is arranged, in response, to generate a new header 7' comprising new VCI and VPI data, and to generate routing data 12 for controlling the routing network 5 (as shown in FIG. 3c). In this embodiment, the routing network 5 is a self-routing network, for example a so-called "butterfly" network of 2×2 selector switches arranged in layers 51,52,53, of FIG. 5, each switch being connected to switches in the next layer spaced laterally at intervals which increase as powers of 2. This is one example of the class of multistage interconnection networks which have the property that the output port of the network depends only upon the direction in which each of the switches is set, and not on the input port of the network (i.e. the first switch in the route through the network) so that a control word which specifies the settings of a switch of each of the layers of the network will uniquely specify one output port of the network, to which a message may be routed through the network irrespective of its starting point. The control data is therefore a prefix 12 of $\log_2 N$ bits, which in turn switch successively encountered switch stages of the network 5, as illustrated in FIG. 5. At each switch stage, the leading bit is used and then discarded.

Figure 3D:
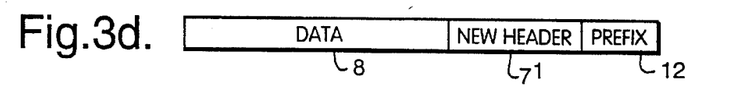

The combiners 11a–11c substitute the new header 7' from the routing table device 6 for the existing header 7; and combine it with the existing data 8 to form a new packet, prefixed with the control data 12 (as shown in FIG. 3d).

Figure 3E:
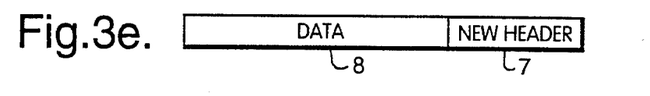

Thus, on leaving the routing network 5 at the output thereof for the destination output channel, the leading bits 12 have been removed to leave the new header 7' and the old data 8 (as shown in FIG. 3e).

Figure 6:
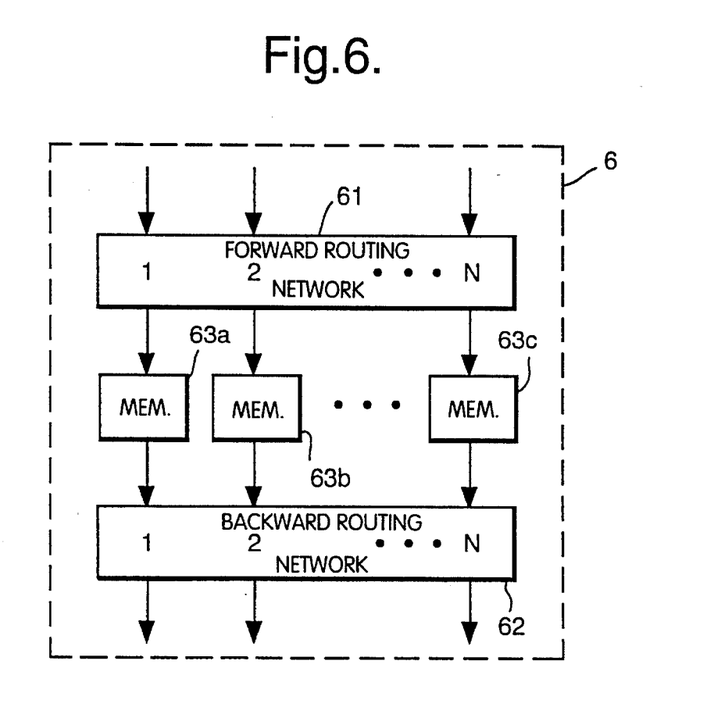
FIG. 6 shows schematically in greater detail a lookup means forming part of the node of FIG. 4.

Referring to FIG. 6, the look-up table device 6 in this embodiment comprises a forward routing network 61, a backward routing network 62, and a plurality of discrete memory devices 63a–63c.

Each of the N channel receivers 4a–4d is connected to an input of the forward routing network 61, and the input (address port) of each of the N memory devices 63a–63c is connected to an output thereof, so that any input channel 4 can be routed to any memory device 63. Likewise, each output (data port) of the N memory devices is connected to an input of the backward routing network 62, and each combiner 11a–11d associated with a respective channel receiver 4a–4d is connected to an output thereof, so that the data 7' from any memory device 63 can be routed to any combiner 11a–11d.

The forward network 61 and the backward network 62 are each, in this embodiment, so-called "butterfly" networks of the same general structure as the routing network 5 illustrated in FIG. 5 and described above, and accordingly a portion 72b of the data applied to the routing network 61 routes the following data 72a through the network 61 to one of the memory modules 63a–63c. The paths connecting nodes of the forward and backward networks are preferably arranged to be parallel bit paths, so that the header 72 or 7' can be transmitted as one or more parallel words; this makes for rapid propagation through the networks 61,62.

Figure 7:
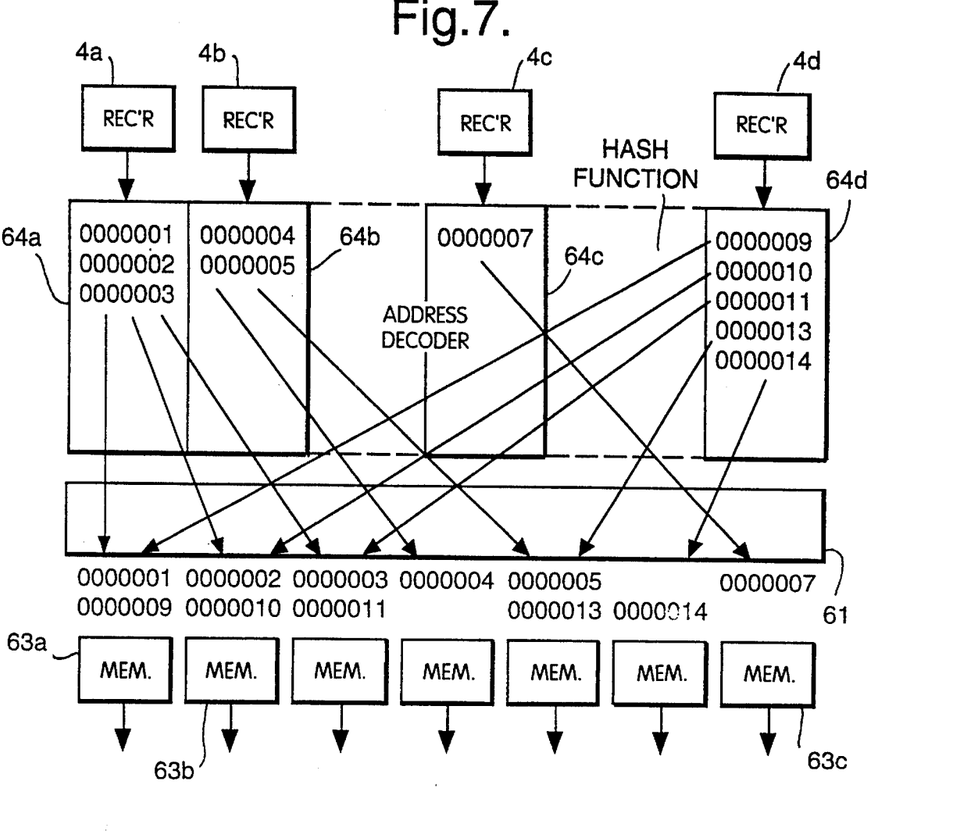
FIG. 7 shows in greater detail the lookup means of part of FIG. 6.
Figure 8:
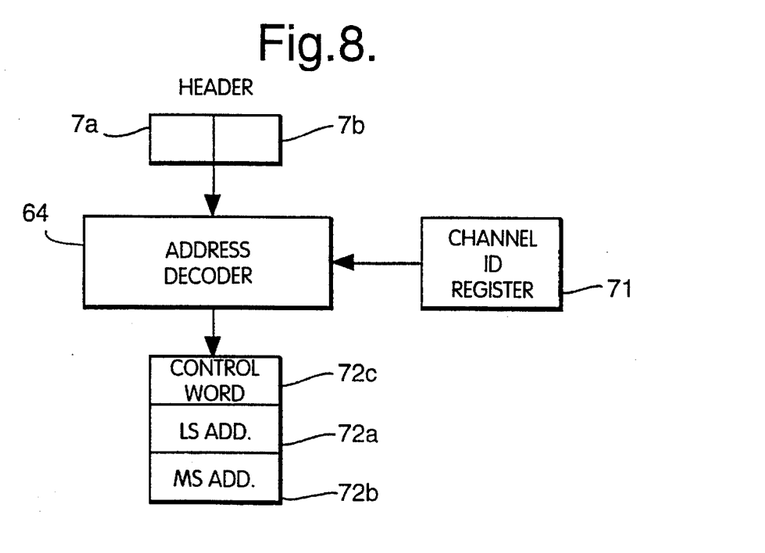
FIG. 8 shows an address allocation means forming part of FIG. 7.

Referring to FIGS. 7 and 8, the destination memory device 63a–63c, and the address within the memory device, for a given message received at a given input receiver unit 4a–4d, is determined by an address decoder circuit 64a–64d provided at the relevant input receiver unit 4a–4d. The address decoder circuit 64 receives the message header 7, together with the output of a register 71 containing a number indicating the identity of the incoming channel 3 (and decoder circuit 64), and generates an output word 72 comprising a least significant (address) portion or word 72a and a most significant (routing) portion or word 72b. It may also generate a control portion or word 72c, for reasons discussed below.

The purpose of the address decoder 64 is to spread the addresses to be accessed by each receiver unit 4 over a plurality of memory devices 63. One simple way of doing this is to distribute successive values of the header 7 over successive memory modules 63a–63c, as schematically indicated in FIG. 7. In other words, for the first receiver unit 4a, the lowest encountered value of VCI and VPI, taken together as a single binary word 7, is distributed to the first memory module 63a; the next higher value to the next memory device 63b; and so on, in a circular fashion.

This can be achieved by use of a linear, modulo N, function, and accordingly the address decoder circuit 64 comprises a logic circuit for executing such a function.

Referring once more to FIG. 7, the most significant word 72b comprises a prefix of $\log_2 N$ bits, which is applied to the forward routing network 61. The suffix or least significant word 72a is supplied to the address inputs of the memory device 63 selected in accordance with the prefix 72b, and accordingly determines the output word generated by the memory device 63.

The path of the output word through the backwards network 62 to a combiner 11 is simply the reverse of the path taken forwards through the forward network 61.

Figure 9:
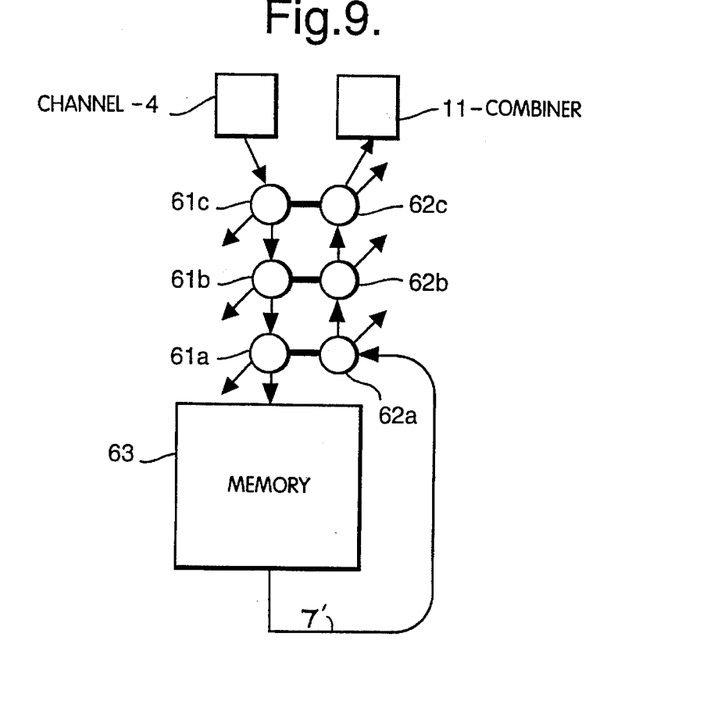
FIG. 9 shows in greater detail forward and backward routing networks forming part of the embodiment of FIG. 6.

In fact, in this embodiment, the backwards network 62 is physically combined with the forward network 61, so that switching a node 61a of the forwards network 61 switches the corresponding node 62a of the backwards network 62. Thus, the new header word generated by the memory device 63 is routed to the combiner 11 which corresponds to the channel receiver 4 from which the message originated, as shown schematically in FIG. 9.

Figure 10:
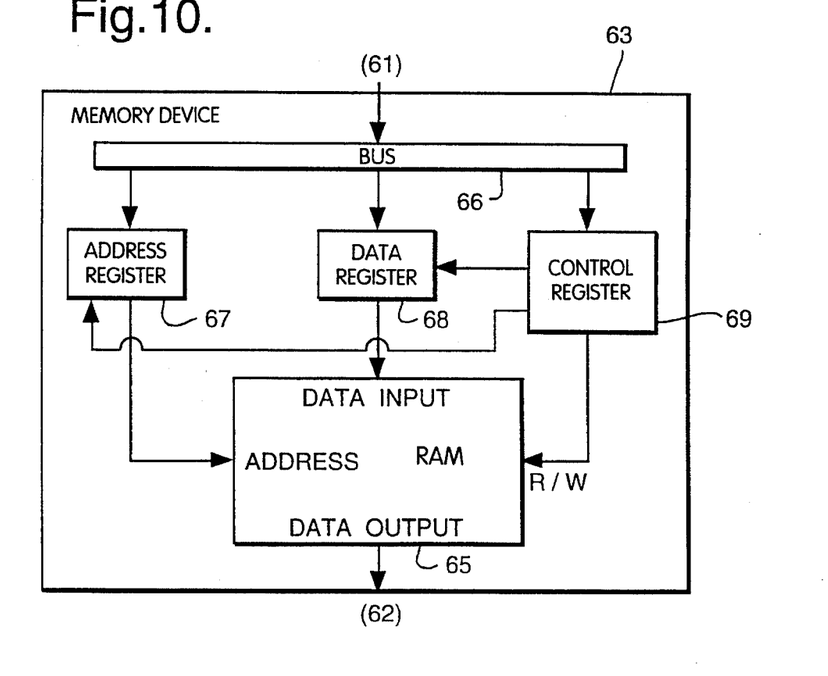
FIG. 10 shows schematically the structure of a memory device in the embodiment of FIG. 6.

FIG. 10 illustrates the structure of each memory device 63 of this embodiment. It comprises a random access memory (RAM) 65, having an address input, a data input and a data output. Signals from the forward network 61 are connected to an internal bus 66, to which are connected an address register 67, a data register 68 and a control circuit 69. The control word 72c is supplied to the control circuit 69 to set the memory 65 to Read or Write mode. The address word 72a is received into the address register 67.

The management unit 9 (FIG. 4) is preferably connected to an input of the forward routing network 61 and an output of the backwards routing network 62, so that it can access the memory devices 63 in the same manner as is performed by the receiver units 4. When it is desired to rewrite the contents of the memory 65, the management unit 9 supplies a routing word 72b, address word 72a and a control word 72c which in this case specifies that data is to be written to the memory 65. The address word 72a and control word 72c are routed to the desired memory 65, and the control word 72c is supplied to the control circuit 69 which is operable in response to select write mode of the memory 65 (at all other times, read mode is selected). The management unit 9 also supplies additional data, which is loaded into the data register 68, to replace the existing VCI, VPI and routing data held at the address specified by the address word 72a. Thus, it is not necessary to provide separate wiring from the management unit 9 to each of the memory units 63.

In operation, when a packet message is received on a channel 3, the respective channel receiver 4 separates the data portion 8 and supplies it to the respective combiner unit 11. The header portion 7 is converted, by the address decoder circuit 64, into a routing word (prefix) 72b, an addressing word (suffix) 72a, and a control word 72c. The addressing word 72a and control word 72c (shown in FIG. 3b) are routed through the forward routing network 61 to the selected one of the memory devices 63 which corresponds to the routing word 72b. The control word 72c is applied to the control circuit 69, which sets the memory 65 to Read mode, and applies the addressing word 72a to the address inputs of the memory 65. The memory 65 correspondingly supplies a new header 7', comprising a new VCI and VPI address, together with a routing prefix 12 (as shown in FIG. 3c). These are supplied to the combiner 11, where the data portion 8 is appended (as shown in FIG. 3d), and the reassembled message is thereafter routed through the self-routing network 5 in accordance with the prefix 12 to one of the output transmitters 10.

From the foregoing, it will be apparent that on occasions, two different receiver units 4 may attempt to access the same memory device 63, leading to memory device contention. Depending on the structure of the forward and backwards routing network 61, 62, it is also possible for the passage of one message through one of the networks to block the passage of another message ("edge contention"). In order to provide for both of these possibilities, each receiver unit 4 is provided with a buffer so that, if contention occurs due to an earlier message from another receiver unit 4, a further attempt to access the memory is subsequently made. In this way, a variable delay in the passage of messages through the routing circuit 6 can arise. Accordingly, each combiner 11 is likewise provided with a buffer, so as to allow successive data portions 8 to be queued. A delay corresponding to an average or minimum time through the routing networks 61, 62 may be provided between the channel receiver 4 and the combiner 11; the delay may be digital, or it may comprise an analog delay such as a length of optical fibre.

The management unit 9 is connected to the input bus 66 of each memory device 63 and, as discussed above, is capable of supplying new data to selected addresses in each memory device to overwrite the existing data. Thus, when it is desired to change the route taken by messages through the telecommunications network, the VCI and VPI substitute data 7' and the routing data 12 can be re-written by the management unit.

It will be clear from the foregoing that, by one particular selection of hashing function to be executed by the address decoder circuit 64, the forward and backward networks 61,62 could be made entirely "transparent", in other words, all the data relating to one input channel could be held in a single corresponding memory device 63. In this case, there will by definition be no contention at the memory devices 63 and (depending upon the structure of the networks 61,62) there is the possibility of no edge contention in the routing networks either. This situation thus corresponds to the possibility of providing a separate memory device for each input channel 3.

However, it will now be understood that adherence to this allocation would require each memory device 63 to be as large as the largest expected number of VCI/VPI combinations for any input channel 3. The present invention, on the other hand, allows the size of each memory device 63 to be decreased towards the <u>average</u> number of addresses likely to be required for each input channel, since it is possible to reallocate memory space which is unused by one input channel for use by another input channel.

SECOND EMBODIMENT

In the above described embodiment, a physically separate backwards routing network 62 is provided, for routing the new header 7' to the combiner 11, from whence the reassembled message is routed through the self-routing network 5 to an output channel 2.

Figure 11:
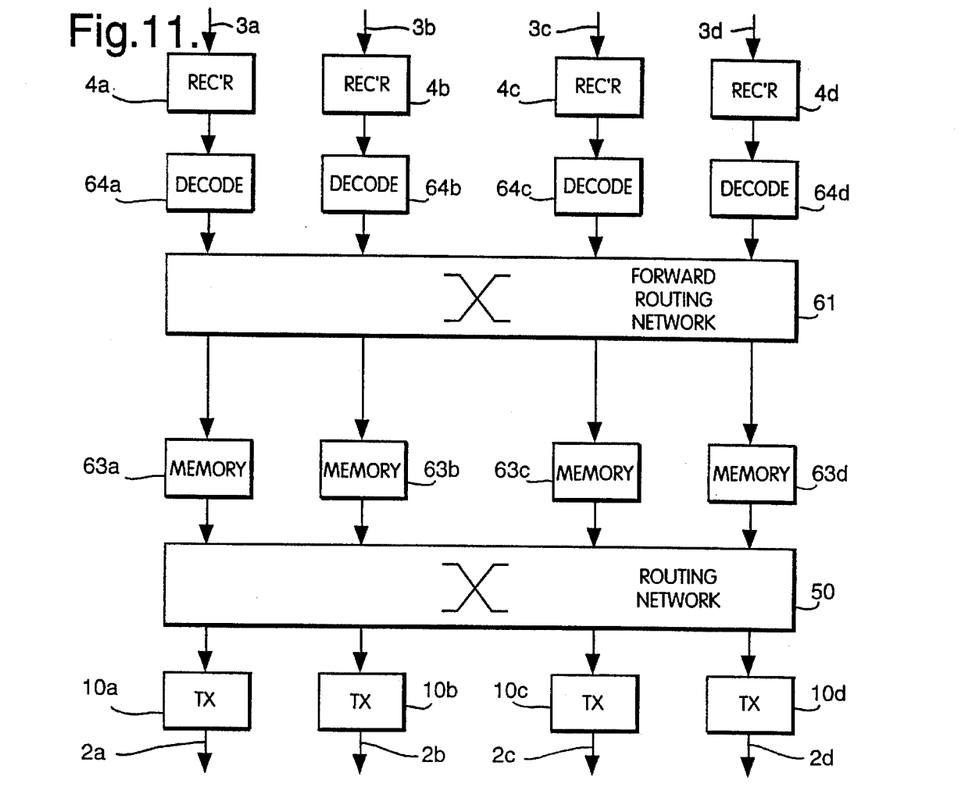
FIG. 11 shows schematically the structure of a node according to a second embodiment of the invention.

In this embodiment, however, the backwards routing network 62 and the self-routing network 5 are combined in a single self-routing network 50, as shown in FIG. 11.

Figure 3F:
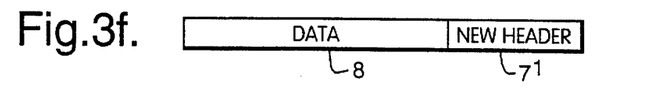
Figure 3G:
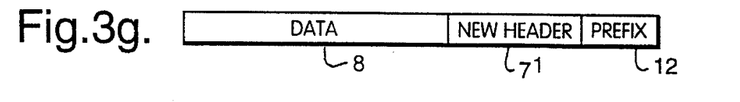
Figure 12:
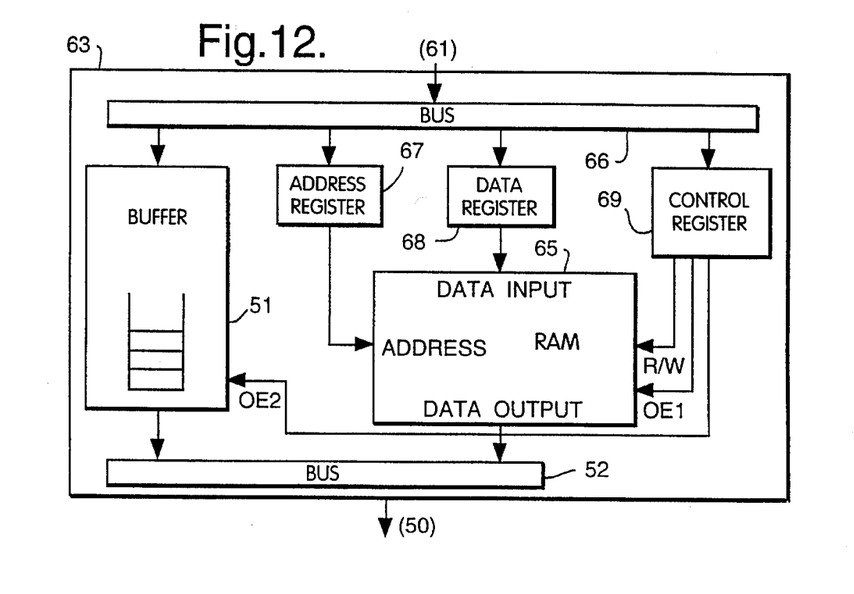
FIG. 12 corresponds FIG. 10 and illustrates the structure of a memory device in the second embodiment.

Referring to FIG. 12, which corresponds in this embodiment to FIG. 10 of the first embodiment, in this embodiment, not only the address word 72a but also the data portion 8 of a received message (as shown in FIG. 3f) is transmitted through the forward network 61 to the memory device 63. As before, the address word 72a is supplied to the address inputs of the memory 65. The following data portion is buffered in a buffer 51 provided within the memory device 65, and the control circuit 69 first enables the read-out of the data output 12,7' of the memory 65 on to an output bus 52, and then enables the read-out of the data portion 8 from the buffer 51 so as to recombine header and data (as shown in FIG. 3g). The output bus 52 of each memory device is connected to an input of the self-routing network 50, through which it is directed to a channel transmitter 10 selected by the value of the routing prefix 12 generated by the memory 65.

In the second embodiment, the hardware redundancy in providing two self-routing networks 62, 5 is eliminated. It may correspondingly be possible for the second embodiment to operate faster than the first embodiment, since messages pass through fewer stages. On the other hand, since the data portion 8 is transmitted through the forward routing network 61, the possibility of contention therein may be higher than in the first embodiment.

The second embodiment has an additional advantage over the first embodiment, since where one or more input channels 3 is particularly busy, this can lead to congestion in the self-routing network 5 of the first embodiment. However, in the second embodiment, activity on one input channel is spread between a number of memory modules 63 and consequently messages enter the routing network 50 at a number of different points, thus spreading the activity and reducing the possibility of contention. In this embodiment, the choice of the hashing function performed by the address decoder circuit 64 may likewise be controlled by the management unit 9 in response to congestion of the routing network 50.

PERFORMANCE OF THE INVENTION

The maximum number of possible addresses (and hence the maximum number of entries in all of the memory devices 63 taken together) is $N.2^{28}$. Thus, the maximum size required of each memory device is $2^{28}$ entries. In practice, however, only a fraction of the possible numbers will actually be connected to subscribers. The fraction will vary from channel to channel and over time.

According to the invention, if 1000 input channels are provided (N=1000) and the total size of the memory devices 63 are taken together as 100 m (where $m=2^{28}$=the maximum number of possible addresses), the memories can be arranged such that each input channel uses 0.1 m addresses each (i.e. 26 million addresses each), or 900 links use 0.01 m addresses (e.g. 2.6 million addresses each) and 100 links use 0.91 m addresses each (approximately 244 million addresses each). Thus, in this example, it will be seen that sufficient memory is available for a significant number of channels to utilise a very high number of possible addresses, provided not all channels are simultaneously busy (which is highly improbable).

By way of comparison, if a separate look-up table were provided for each input channel, in order to allow even one input channel to use 0.91 m addresses, it would be necessary for the memory device for every channel to be of size 0.91 m, and so the total amount of memory required would be 910 m (91 times as high as in the above example according to the invention).

Thus, given a typical pattern of channel usage, the present invention provides a flexible solution offering relatively fast access and relatively low volume of memory, even where the number of input channels is very high. This may make it possible to provide telecommunication networks consisting of fewer, higher capacity exchanges that at present, interconnected by optical fibre cables.

Another advantage of the invention is that the management unit 9 need not be physically connected to multiple separate tables; instead, it can access each memory device 63 via the forward routing network 61 to amend the data therein.

The required arrival times to be managed by the memory devices 65 are given by (total number of bits in a packet) / (incoming serial transmission rate) (probability of arrival at a given input).

Thus, for example, with a serial data rate of 155 Megabits per second, and a probability of 1.0, the time between arrivals is 2.7 milliseconds. Higher transmission rates reduce this available time, whereas lower probabilities of arrival of a packet on a given input reduce it. Existing technology for the routing network 61,62 and memory devices 63 is well able to deal with a packet between arrival times of this order.

OTHER VARIATIONS AND EMBODIMENTS

Although in the foregoing, the management unit 9 is described as controlling the allocation of memory in accordance with observed contention within the node device, it is also or alternatively possible for the management units 9 of a plurality of different devices to communicate one with another during a network signalling phase to allocate suitable memory contents and hashing functions in accordance with expected traffic on the network.

As well as simply changing the identities of the contents of each memory device 63, the balance of the addresses allocated between the different input channels 3 and associated receiver units 4 might also be altered, although this could require the entire device to be taken out of service whilst the memories 63 are rewritten. For example, if the number of VCI and VPI active addresses received on one input channel increases and the number on another channel decreases, the share of address space across the memory devices 63 allocated to the first can correspondingly be increased and that corresponding to the second can correspondingly be decreased.

Particular traffic conditions could, in principle, lead to significant contention at particular memory devices 63, or at particular nodes of the forward and backwards routing networks 61, 62. If this is found to be occurring (e.g. by monitoring, by the management unit 9, of the occupancy of the buffers at the combiners 11) the problem may be addressed by changing the "hashing" function executed by the address decoder circuits 64 (and, as a consequence, re-writing the memory devices 63 to correspondingly reallocate the contents thereof between different memory units 63). Thus, if contention is found to be occurring at a particular memory device 63a, the contents of that device are distributed amongst the other devices 63b–63d in an even fashion so as to reduce the contention at that device.

Although the management unit 9 of the above embodiments is part of the node (exchange), it could be provided at another point in the network, communicating with the node either via a special line or over one of the input channels 3.

Further information on possible hashing functions which might be useful in the invention is to be found in Proc. PARLE 93, Parallel Architectures and Languages Europe, published by Springer Verlag 1993, pages 1–11, C. Engelmann and J. Keller; "Simulation—Based Comparison of Hash Functions for Emulated Shared Memory", incorporated herein by reference, and in Proc. of the Fifth Symposium on Parallel and Distributed Processing, Dallas, Tex. (USA), Dec. 1–4 1993; J. Keller; "Fast Rehashing in PRAM emulations".

Although in the above described embodiments the numbers of memory devices 63 are equal to the number of input and output channels 2,3, this is not essential, nor is it essential that every input channel is connected to every memory device; some of the benefits of the invention can be achieved without these constraints. Protection is sought for any and all new and useful matter described above, singularly or in combination.

It will be clear that various modifications and changes to the above described embodiments can be made without changing the nature of the invention. Accordingly, the invention is not limited to the particular details described above, but includes all obvious variants and modifications thereto.

I claim:

1. A communications routing device for routing messages between a plurality of input channels and a plurality of output channels, comprising:

routing means for selectively routing a received message from a first input channel to a first output channel in dependence upon routing data;

a plurality of memory devices, each containing stored routing data stored at corresponding addresses therein, each memory device comprising an address port for receiving an address signal corresponding to an address and a data port for outputting the stored routing data stored at the address corresponding to said address signal, said memory devices being separately accessible in parallel; and an access circuit connected to the address ports of said plurality of memory devices and connected to said first input channel, said access circuit being operable, in response to the content of said received message, to select a single selected memory device of said plurality of memory devices, to generate a single address signal dependent upon said content of said received message, to supply said address signal to the address port of only said selected memory device, and to supply said stored routing data from the data port of said selected memory device to said routing means.

2. A communications routing device as claimed in claim 1, in which each said memory device further comprises a data input port, and further comprising altering means, connected to the address ports and the data input ports of said plurality of memory devices, for selectively altering the stored routing data stored in said memory devices.

3. A communications routing device as claimed in claim 2 in which the altering means is connected to said access circuit, via which it is connected to said address ports.

4. A communications routing device as claimed in claim 1, in which the received message comprises a header portion and a data portion, and in which the access circuit is responsive to the header portion to select said memory device and to generate said address signal.

5. A communications routing device as claimed in claim 4 in which said stored routing data specifies said first output channel.

6. A communications routing device as claimed in claim 4 in which said stored routing data comprises substitute header data, and in which said access circuit further comprises combining means, connected to said data ports, for combining said substitute header data with the data portion of said received message.

7. A communications routing device as claimed in claim 6, in which said routing means is connected between said combining means and said output channels.

8. A communications routing device as claimed in claim 1, further comprising a plurality of channel receivers coupled to said input channels and to said access circuit.

9. A communications routing device as claimed in claim 8, in which said channel receivers are ATM receivers and said messages are ATM cells.

10. A communications routing device as claimed in claim 8, in which said channel receivers are optical receivers.

11. A communications routing device for routing messages between a plurality of input channels and plurality of output channels, comprising:

routing means for selectively routing a received message from a first input channel to a first output channel in dependence upon routing data;

a plurality of memory devices., each containing stored routing data stored at corresponding addresses therein, each memory device comprising an address port for receiving an address signal corresponding to an address and a data port for outputting the stored routing data stored at the address corresponding to said address signal, said memory devices being separately accessible in parallel; and an access circuit connected to the address ports of said plurality of memory devices and connected to said first input channel, said access circuit being operable, in response to the content of said received message, to select a single selected memory device of said plurality of memory devices, to generate a single address signal dependent upon said content of said received message, and to supply said address signal to the address port of said selected memory device, in which the received message comprises a header portion and a data portion, and in which the access circuit is responsive to the header portion to select said memory device and to generate said address signal, and in which said stored routing data comprises substitute header data, and further comprising combining means, connected to said data ports, for combining said substitute header data with the data portion of said received message, and in which said access circuit comprises an inward routing network connected between said input channels and said address ports, for routing at least said header portion to said selected memory device.

12. A communications routing device as claimed in claim 11, in which said inward routing network also routes said data portion, and said combining means comprise a plurality of combining circuits, each associated with one of said memory device.

13. A communications routing device as claimed in claim 11, in which said access circuit further comprises a further routing network, and said combining means comprises a plurality of combining circuits, and said further routing network connects said data ports with said combining circuits.

14. A communications routing device as claimed in claim 13, in which said inward routing network comprises a plurality of inward paths, and said further routing network comprises a plurality of outward paths, and further comprising a plurality of routing nodes for selectively interconnecting a plurality of said inward paths, said nodes also selectively interconnecting said outward paths.

15. A communications routing device as claimed in claim 13, in which said inward routing network comprises a plurality of inward paths, and said further routing network comprises a plurality of outward paths, and in which said access circuit further comprises a plurality of inward routing nodes for selectively interconnecting a plurality of said inward paths, a plurality of outward routing nodes for selectively interconnecting said outward paths, and a control circuit for jointly controlling said inward nodes and said outward nodes, in dependence upon said header portion.

16. A communications routing device for routing messages between a plurality of input channels and plurality of output channels, comprising:

a routing device for selectively routing a received message from a first input channel to a first output channel in dependence upon routing data;

a plurality of memory devices, each containing stored routing data stored at corresponding addresses therein, each memory device comprising an address port for receiving an address signal corresponding to an address and a data port for outputting the stored routing data stored at the address corresponding to said address signal, said memory device being separately accessible in parallel; and an access circuit connected to the address ports of said plurality of memory devices and connected to said first input channel, said access circuit being operable, in response to the content of said received message, to select a selected memory device of said plurality of memory devices, to generate an address signal dependent upon said content of said received message, and to supply said address signal to the address port of said selected memory device, in which said access circuit comprises an inward routing network connected between said input channel and said address input ports for routing said address signal to said selected memory device in accordance with control data, and a control circuit for generating said control data dependent upon said content of said received message.

17. A communications circuit as claimed in claim 16, in which said access circuit comprises means for prefixing said control data as a prefix to said address signal, and said inward routing network is responsive to said prefix to route said address signal.

18. A communications routing device as claimed in claim 16, in which said control circuit also generates said address signal.

19. A communications routing device as claimed in claim 16, in which said received message comprises a routing portion, and said control device applies a function to said routing portion to generate said control data.

20. A communications routing device as claimed in claim 19, in which said function is such that, over time, for messages received from each said input channel, said access circuit will access in sequence, all of said memory devices.

21. A communications routing device as claimed in claim 19, in which said function is a linear modulo-N function.

22. A communications routing device as claimed in claim 19, in which said routing portion comprises an address lying in an address sequence, and the function is such as to distribute successive addresses of said sequence successively between said memory devices.

23. A communications routing device as claimed in claim 19, further comprising means for changing said function.

24. A communications routing device as claimed in claim 19, further comprising means for changing said function.

25. A method of routing a received message through a communications routing device, said device comprising a routing circuit for selectively routing said received message between one of a plurality of input channels and one of a plurality of output channels and a plurality of memory devices storing routing data for routing said received message dependent upon its content, said method comprising the steps of:

receiving a received message on one or said input channels;

selectively accessing only a single one of said memory devices in dependence upon the content of said received message;

reading routing data from said one of said memory devices;

supplying said routing data to said routing circuit;

routing said received message through said routing circuit; and emitting said received message on one of said output channels.

26. A method as claimed in claim 25, further comprising the step of controlling said routing device in accordance with said routing data.

27. A method as claimed in claim 25, further comprising the step of modifying said received message in accordance with said routing data, to modify subsequent routing of said received message.

28. The method of claim 25, in which said received message is an ATM cell and said communications routing device is an ATM routing node.

29. A communications routing device for routing messages between a plurality of input channels and plurality of output channels, comprising:

routing means for selectively routing a received message from a first input channel to a first output channel in dependence upon routing data;

a plurality of memory devices, each containing stored routing data stored at corresponding addresses therein, each memory device comprising an address port for receiving an address signal corresponding to an address and a data port for outputting the stored routing data stored at the address corresponding to said address signal, said memory devices being separately accessible in parallel; and an access circuit connected to the address ports of said plurality of memory devices and connected to said first input channel, said access circuit being operable, in response to the content of said received message, to select a single selected memory device of said plurality of memory devices, to generate an address signal dependent upon said content of said message, to supply said address signal to the address port of said selected memory device and to supply said stored routing data from the data port of said selected memory device to said routing means in which said access circuit comprises an inward routing network connected between said input channels and said address ports for routing said address signal to said selected memory device in accordance with control data, and an address distributing circuit for generating said control data dependent upon said content of said message.

30. A communications routing device as claimed in claim 29, in which said access circuit comprises means for prefixing said control data as a prefix to said address signal, and said inward routing network is responsive to said prefix to route said address signal.

31. A communications routing device as claimed in claim 29, in which said address distributing circuit also generates said address signal.

32. A communications routing device as claimed in claim 29, in which said received message comprises a routing portion, and said address distributing circuit applies a function to said routing portion to generate said control data.

33. A communication routing device as claimed in claim 32, in which said function is such that, over time, for messages received from each said input channel, said access circuit will access in sequence, all of said memory devices.

34. A communications routing device as claimed in claim 32, in which said function is a linear modulo-N function.

35. A communications routing device as claimed in claim 32, in which said routing portion comprises an address lying in an address sequence, and the function is such as to distribute successive addresses of said sequence successively between said memory devices.

36. An ATM routing node for routing ATM cells between a plurality of input channels and plurality of output channels, comprising:

routing means for selectively routing a received ATM cell comprising a header portion and a data portion from a first input channel to a first output channel; and an ATM cell header replacement device comprising;

a plurality of memory devices, each containing stored ATM cell header replacement data stored at corresponding addresses therein, each memory device comprising an address port for receiving an address signal corresponding to an address and a data port for outputting the stored ATM cell header replacement data stored at the address corresponding to said address signal, said memory devices being separately accessible in parallel; and an access circuit connected to the address ports of said plurality of memory devices and connected to said first input channel, said access circuit being operable, in response to the header of said received ATM cell, to select a single selected memory device of said plurality of memory devices, to generate an address signal dependent upon said header of said ATM cell, to supply said address signal to the address port of said selected memory device, and to combine said stored ATM cell header replacement data with said data portion; in which said access circuit comprises an inward routing network connected between said input channels and said address ports for routing said address signal to said selected memory device in accordance with control data, and an address distributing circuit for generating said control data dependent upon said header of said ATM cell.

\* \* \* \* \*